(12) United States Patent
Yairi et al.

(10) Patent No.: US 8,964,092 B2
(45) Date of Patent: Feb. 24, 2015

(54) STORAGE DEVICE, DIGITAL CAMERA DEVICE, AND METHOD FOR DISPLAYING AN ALERT IMAGE (71) Applicants: Rahav Yairi, Oranit (IL); Itzhak Pomerantz, Kefar Sava (IL)

(72) Inventors: Rahav Yairi, Oranit (IL); Itzhak Pomerantz, Kefar Sava (IL)

(73) Assignee: SanDisk Technologies Inc., Plano, TX (US)

( * ) Notice: Subject to any disclaimer, the term of this patent is extended or adjusted under 35 U.S.C. 154(b) by 121 days.

(21) Appl. No.: 13/767,568

(22) Filed: Feb. 14, 2013

(65) Prior Publication Data

US 2014/0176762 A1 Jun. 26, 2014

Related U.S. Application Data (60) Provisional application No. 61/745,928, filed on Dec. 26, 2012.

(51) Int. Cl.
*H04N 5/222* (2006.01)
*H04N 5/232* (2006.01)

(52) U.S. Cl.
CPC ....... *H04N 5/23293* (2013.01); *H04N 5/23203* (2013.01); *H04N 5/23241* (2013.01)
USPC ................................. 348/333.04; 348/231.9

(58) Field of Classification Search
CPC .................................................. H04N 5/23293
USPC .................... 348/231.2, 231.3, 231.9, 333.04
See application file for complete search history.

(56) References Cited

U.S. PATENT DOCUMENTS

| | | |
|---|---|---|
| 5,481,303 A | 1/1996 | Uehara |
| 2001/0000969 A1* | 5/2001 | Ohta et al. ..................... 348/231 |
| 2008/0170850 A1* | 7/2008 | Karasawa ..................... 348/243 |
| 2010/0053372 A1* | 3/2010 | Shimizu et al. ............ 348/231.3 |
| 2011/0187896 A1* | 8/2011 | Hamada ..................... 348/231.2 |

* cited by examiner

*Primary Examiner* — Gevell Selby
(74) *Attorney, Agent, or Firm* — Brinks Gilson & Lione (57) ABSTRACT A storage device, digital camera device, and method for displaying an alert image are disclosed. In one embodiment, a storage device is provided having an interface, a memory, and a controller. The controller is configured to determine if an alert condition has occurred and, if the alert condition has occurred, to display an alert image on a display device of the digital camera device when the digital camera device displays images stored in the memory. Some or all of these acts can be performed by the digital camera device instead of the storage device. Other embodiments are possible, and each of the embodiments can be used alone or together in combination.

28 Claims, 5 Drawing Sheets

STORAGE DEVICE, DIGITAL CAMERA DEVICE, AND METHOD FOR DISPLAYING AN ALERT IMAGE

CROSS-REFERENCE TO RELATED APPLICATION

This application claims the benefit of U.S. Provisional Patent Application No. 61/745,928, filed Dec. 26, 2012, which is hereby incorporated by reference herein.

BACKGROUND

Some digital camera devices, such as digital cameras and some mobile phones, allow a user to take a digital image and store the image on a storage device, such as a memory card. Because the storage device has a limited capacity, the user is limited to the number of images he can store on the storage device. With some digital camera devices, when the storage device is full, the digital camera device displays a "Memory Full" message to inform the user that no additional images can be stored. Other digital camera devices display the available capacity in terms of megabytes or remaining images to be taken or percentage of its capacity. In some digital camera devices, this information is either automatically and continuously displayed for the user when the digital camera device is in capture mode, while, in other digital camera devices, this information is displayed in response to a user request (e.g., by the user navigating to a menu that displays storage device capacity information).

Overview

Embodiments of the present invention are defined by the claims, and nothing in this section should be taken as a limitation on those claims.

By way of introduction, the below embodiments relate to a storage device, digital camera device, and method for displaying an alert image. In one embodiment, a storage device is provided having an interface, a memory, and a controller. The controller is configured to determine if an alert condition has occurred and, if the alert condition has occurred, to display the alert image on a display device of the digital camera device when the digital camera device displays images stored in the memory. Some or all of these acts can be performed by the digital camera device instead of the storage device.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

In general, the following embodiments disclose a storage device, digital camera device, and method for displaying an alert image. As discussed above, some digital camera devices provide information to a user concerning the available capacity of a storage device to store digital images. However, if the user is not paying close attention to this display of information, or if the user can only see the information by manually navigating to a menu, the user may not be aware that the storage device is nearing capacity until he attempts to take a digital image and receives a "Memory Full" message. This can be frustrating to a user, especially if the user was attempting to capture a special, one-in-a-lifetime moment.

These embodiments provide mechanisms to alert the user that the memory is almost full. In one embodiment, this alert comes in the form of an alert image that is displayed to the user before the storage device reaches its capacity. In response to this alert image, the user can make more room on the storage device (e.g., by deleting or moving pictures off the storage device), swap out the storage device with another storage device that has more available capacity, or change the image format to a more economic format (e.g., a lower resolution format). In either case, the user is given a clear warning by way of the alert. While some prior digital camera devices display available capacity or remaining shots, this information may not catch the user's attention. By way of analogy, a fuel gauge on an automobile makes the level of available fuel readily viewable by a driver, but a driver may not notice he is approaching an empty tank until the "low fuel" light and warning bell goes on. These embodiments provide a similar type warning for digital camera devices. However, it should be noted the alert image can convey other information instead of or in addition to "memory almost full" information.

Before turning to these and other embodiments, the following section describes exemplary digital camera and storage devices. It should be noted that these exemplary digital camera and storage devices are merely examples and that other designs can be used.

Exemplary Digital Camera and Storage Devices

Figure 1:
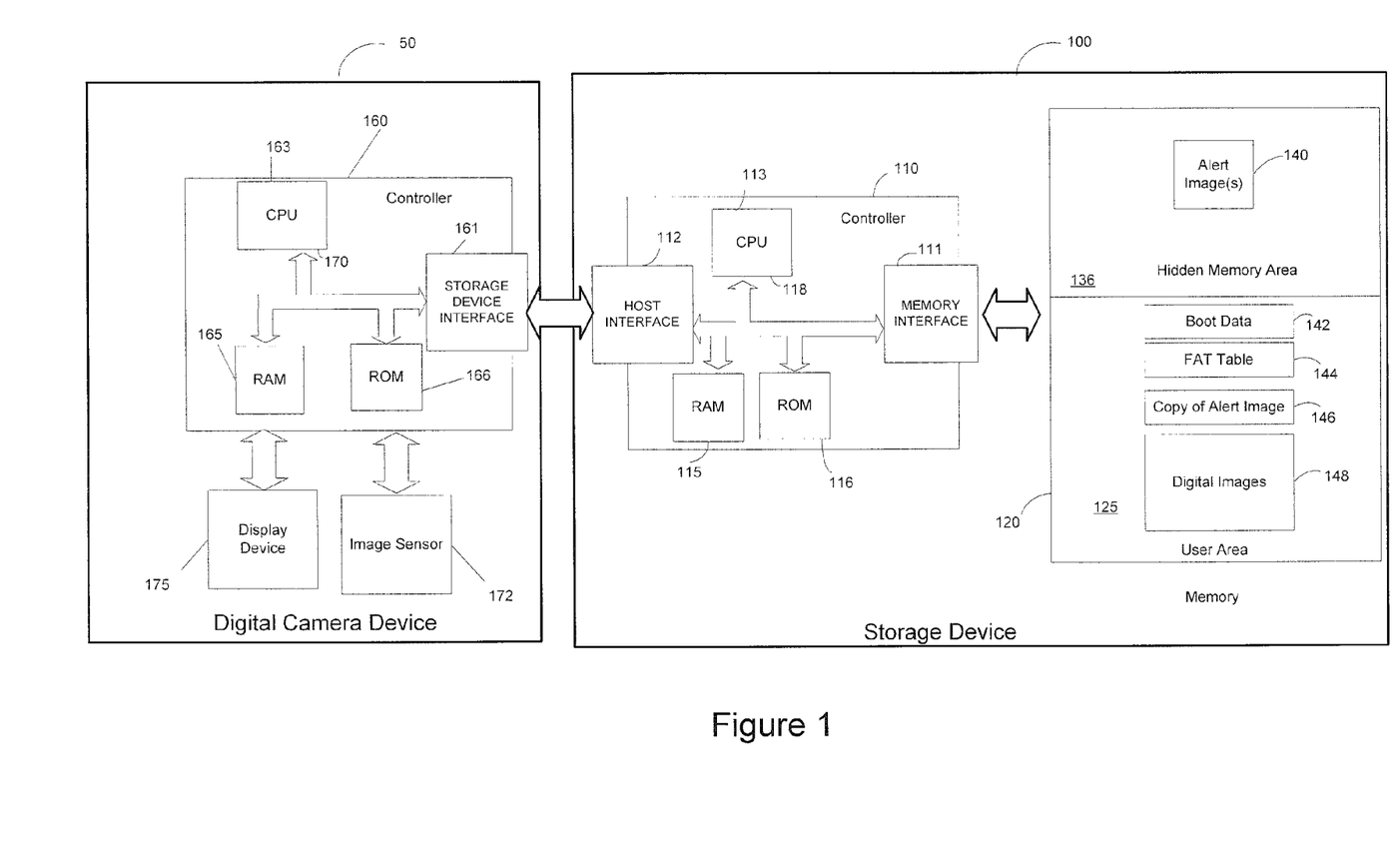
FIG. 1 is a block diagram of an exemplary digital camera device and storage device of an embodiment.

Turning now to the drawings, FIG. 1 is a block diagram of a digital camera device 50 in communication with a storage device 100 of an embodiment. As used herein, the phrase "in communication with" could mean directly in communication with or indirectly in communication with through one or more components, which may or may not be shown or described herein. For example, the digital camera device 50 and storage device 100 can each have mating physical connectors (interfaces) that allow the storage device 100 to be removably connected to the digital camera device 50.

As also used herein, "digital camera device" refers to a device that has the ability to capture digital images (e.g., digital pictures). A digital camera device 50 can be a device that is dedicated to taking digital images, such as a traditional digital camera. A digital camera device 50 can also be a device that has a variety of functions, one of which is the ability to take digital images. Examples of such devices that can have digital camera functionality include, but are not limited to, a mobile/smart phone, a tablet, a game device, a book reader, and a personal digital assistant (PDA). A digital camera device 50 can have a capture mode, in which the digital camera device 50 can take still photos, and a playback (or review) mode in which the digital camera device 50 shows earlier-taken photos.

A storage device refers to a device that contains a storage unit and a controller that controls the operations of the storage device. In one embodiment, the storage device 100 takes the form of a handheld, removable memory card, such as a Secure Digital (SD) card, a microSD card, a CompactFlash (CF) card, or a MultiMedia Card (MMC). However, the storage device 100 can take other forms, such as, but not limited to, a universal serial bus (USB) device, a removable or non-removable hard drive (e.g., magnetic disk or solid-state drive), or embedded memory.

As shown in FIG. 1, the storage device 100 comprises a controller 110 and a memory 120. The controller 110 comprises a memory interface 111 for interfacing with the memory 120 and a host interface 112 for interfacing with the digital camera device 50. The controller 110 comprises a central processing unit (CPU) 113, RAM 115, and ROM 116, although different components are possible. The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. In one embodiment, the ROM 116 stores firmware (computer-readable program code) that is executed by the CPU 113. This firmware can implement a variety of functionality on the storage device 100, including the alerting functionality of these embodiments. The following section discusses examples of such functionality in conjunction with flow charts of operations that can be carried out by the controller 110 (e.g., via the CPU 113 executing the firmware stored in the ROM 116). Other implementations are, of course, possible.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used (when used with a controller). In one embodiment, the memory 120 comprises a user area 125 that is managed by a file system on the digital camera device 50 and a hidden memory area 136 that is internally managed by the controller 110. Other configurations are possible.

Turning now to the digital camera device 50, the digital camera device 50 comprises a controller 160 that has a storage device interface 161 for interfacing with the storage device 100. The controller 160 also comprises a central processing unit (CPU) 163, read access memory (RAM) 165, and read only memory (ROM) 166. In one embodiment, the ROM 166 stores firmware (computer-readable program code) that is executed by the CPU 163. This firmware can implement a variety of functionality on the digital camera device 50. The digital camera device 50 also contains an image sensor 172 (e.g., a CCD or CMOS sensor chip) that turns light into discrete signals. These signals are turned into digital images by the controller 160 or by an image sub-system (not shown) in the digital camera device 50. The digital camera device 50 also contains a display device 175 for displaying stored images and, optionally, to act as a view finder to display what the image sensor 172 is sensing before a digital image is captured. The digital camera device 50 can contain other components, especially if the digital camera device 50 is not a dedicated digital camera. Examples of these other components include, but are not limited to, a speaker, a headphone jack, a video output connection, a touch-sensitive screen or pad, a keyboard, an internal storage device storing games or applications, etc.

With the exemplary host and storage devices now explained, the following sections provides a discussion of embodiments related to displaying an alert image.

Embodiments Related to Displaying an Alert Image

These embodiments provide mechanisms to alert the user that the memory 120 is almost full. In one embodiment, this alert comes in the form of an alert image that is displayed to the user before the storage device 100 reaches its capacity. In response to this alert image, the user can make more room on the storage device 100 (e.g., by deleting or moving pictures off of the storage device 100) or can swap out the storage device 100 with another storage device that has more available capacity. In either case, the user is given a clear warning by way of the alert image.

Figure 2:
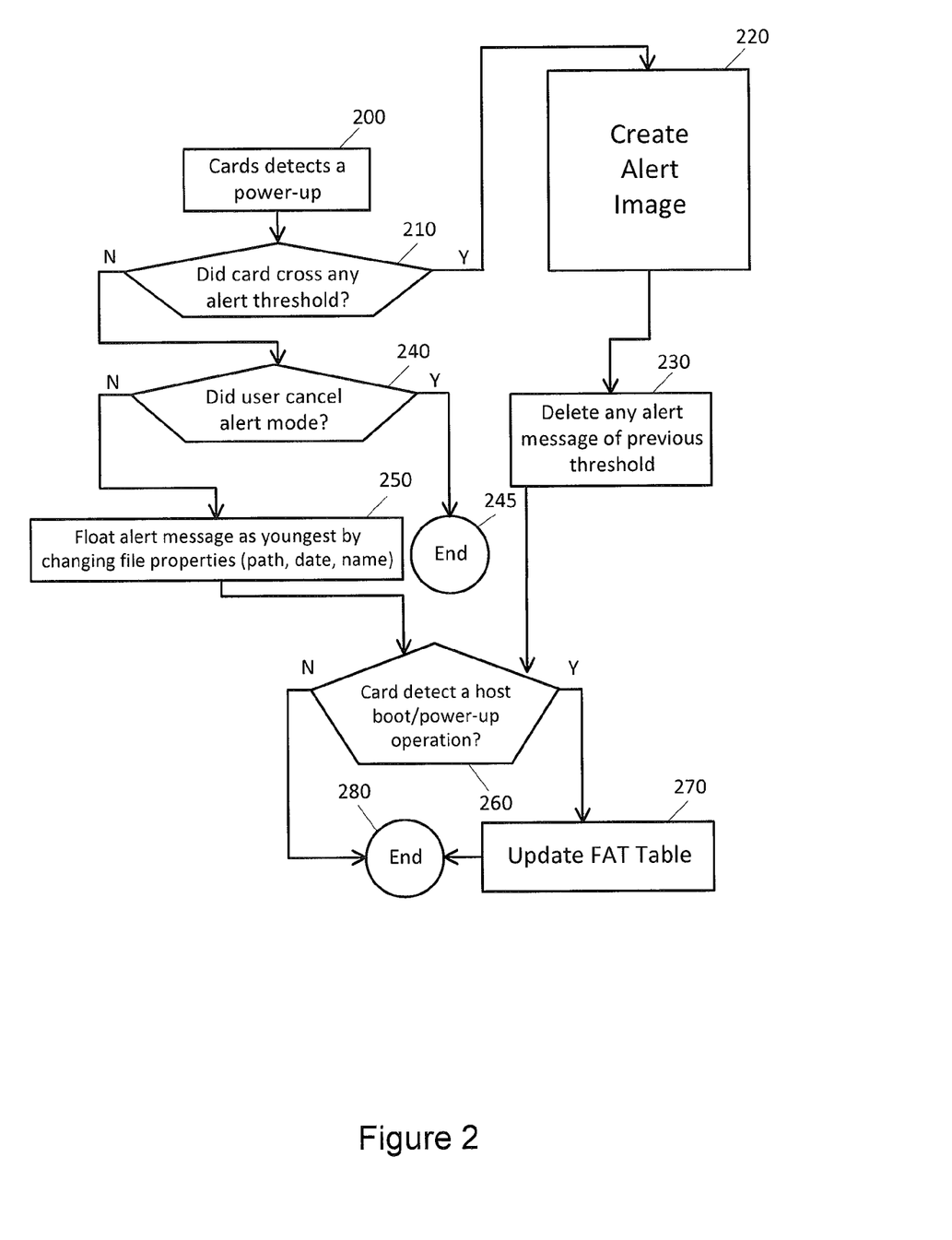
FIG. 2 is a flow chart of a method of an embodiment for displaying an alert image.
Figure 3A:
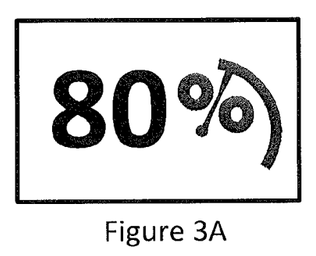
FIGS. 3A-3E are illustrations of alert images of an embodiment.
Figure 3B:
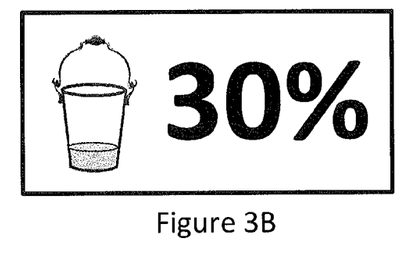
Figure 3C:
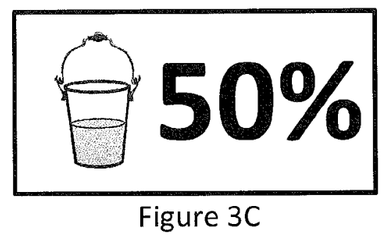
Figure 3D:
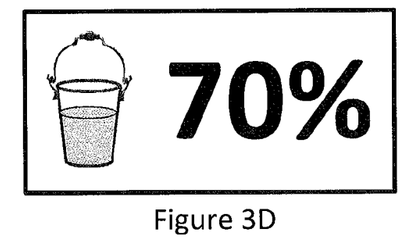
Figure 3E:
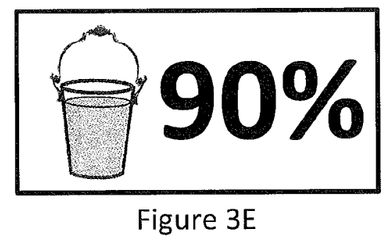

FIG. 2 is a flow chart of one possible embodiment. This flow chart can be implemented by the controller 110 of the storage device 100 (e.g., by executing firmware code stored in the storage device 100), or a pure hardware implementation can be used. In this embodiment, the storage device 50 takes the form of a memory card (although other types of storage devices can be used), and the digital camera device 50 is referred to as the host. Also, in this embodiment, the various acts in this flow chart are triggered when the storage device 100 is powered up (act 200). (It should be noted that this is one implementation and that, in other implementations, some or all of these acts can occur at different times and possibly in a different order.) The storage device 100 may have been powered down because the digital camera device 50 was also powered down, or the digital camera device 50 may have powered down the storage device 100 (without powering itself down) to save power.

The controller 110 first determines if the storage device 100 crossed an alert threshold (i.e., if an alert condition has occurred) (act 210). In this embodiment, the storage device 100 crosses an alert threshold when an available capacity of the memory 120 crosses a threshold limit. (As will be discussed below, events in addition to or other than crossing a capacity threshold limit can cause an alert condition to occur.) The controller 110 can use any suitable technique to determine when an available capacity of the memory 120 crosses a threshold limit. In one embodiment, the memory 120 stores a file allocation table (FAT) 144 (see FIG. 1), and the controller 110 can parse the file system data in the FAT table 144 to calculate the total size of the stored digital images 148 (and other data that may be stored in the memory 120). This calculation can be done relatively quickly while servicing commands from the digital camera device 50 and can be broken into short segments. The size of the stored data (or the remaining available capacity of the memory 120) is then compared against a threshold value to determine if the threshold limit has been crossed. The threshold limit can be a predetermined value preset in the storage device 100 (e.g., 80% of the available capacity has been used) or can be dynamically determined based on one or more conditions. For example, the controller 110 can decide to alert the user sooner or later depending on the frequency of image capture (i.e., how many pictures the user is taking over a period of time). Also, while a single threshold value can be used, the controller 110 can also apply different threshold values to generate different alert levels, as will be discussed in more detail below.

If the controller 110 determines that the alert condition has occurred, the controller 110 creates an alert image in the memory 120 so that the alert image is displayed on the display device 175 of the digital camera device 50 when the digital camera device 50 displays images stored in the memory 120 (act 220). (As discussed herein, the alert image can be pre-stored in the memory 120, so the alert image is "created" by adding a reference to the alert image to a file system table. Alternatively, the alert image can be created by actually generating the image (instead of having the image be pre-stored.)) As used herein, an "alert image" is an image that functions to alert the user that an alert condition has occurred and is displayed in a similar fashion as images taken by the digital camera device 50. An alert image is displayed in the same manner as any other image stored in the memory 120 (e.g., displayed when the digital camera device 50 is in review mode), as compared to icons or characters that are stored in the digital camera device 50 and displayed, not as an image, but as indicia, and at times other than when the digital camera device 50 is in review mode. Also, while the alert image file can be in any suitable format, in one embodiment, the alert image is in a generic JPEG format that is acceptable by most digital camera models and displays in a similar size as the images taken by the digital camera device 50. Also, the displayed alert image can take any suitable form. An alert image can have writing, symbols, or other markings or can simply be a color (e.g., green for almost empty, yellow for partially full, and red for almost or completely full), or a combination of indicia and colors. FIGS. 3A-3E provide examples of exemplary alert images, although others can be used. Also, in one embodiment the alert image is "synthetic" in that it is artificially (i.e., computer) generated for the purpose of being an alert image rather than being an image of a real object taken by a digital camera device. However, in an alternate embodiment, the alert image is not a synthetic image but rather a real image (perhaps even one taken by a user with the digital camera device 50 and selected by the user for use as an alert image). Also, while an alert image can be a stand-alone image, an alert image can also be a composite or modification of other images. For example, an alert image can an image, such as the one shown in FIG. 3A, or can be the image shown in FIG. 3A superimposed on top of a copy of one of the user-taken images stored in the storage device. As can be seen by all of these many examples, an alert image can take a wide variety of forms.

In one embodiment, the alert image(s) 140 is stored in a hidden memory area 136 of the memory 120 and is copied from the hidden memory area 136 to the user area 125 when the alert condition occurs (see FIG. 1). By being stored in the hidden memory area 136, the alert image(s) 140 will not be erased if a user performs a format operation (which only affects the user area 125) or attempts to erase all of the digital images 148 stored in the user area 125. (In addition to the alert image(s) 140, the hidden memory area 136 can also include other information to be protected from formatting and erasure, such as the computer-readable program code that provides the storage device with the alert functionality.) Of course, the alert image(s) 140 can be stored in any suitable location. The term "image(s)" is used because, as mentioned above, the storage device 100 can store a plurality of alert images to be used based on what alert condition has occurred. So, for example, all of the images shown in FIG. 3A-3E can be stored in the storage device 100 and can be used when the memory 120 is 80%, 30%, 50%, 70%, and 90% full, respectively. As will be discussed in more detail below, there can be many different types of categories of alert images, so the alert image(s) 140 stored in the memory are be of one or more than one category (e.g., memory capacity alerts, suggestions to user a flash or tripod, warnings about memory endurance, etc.).

There are many ways that the controller 120 can create the alert image so that it is displayed when the digital camera device 50 displays images stored in the memory 120. For example, the controller 110 can make a copy of the alert image 140 stored in the hidden memory area 136 and store the copy 146 in the user area 125. The controller 125 can then update the FAT table 144 (when and how the FAT table 144 can be updated will be discussed in more detail below) to place the alert image in the same directory as the other images that will be displayed by the digital camera device 50.

In one embodiment, the alert image is the first image that is displayed, while, in other embodiments, the alert image is not the first image. By having the alert image be the first image that is displayed, the user can see the alert image in a wide variety of situations. For example, many digital camera devices have a switch to toggle between a capture mode, in which the digital camera device can take still photos, and a playback (or review) mode in which the digital camera device shows earlier-taken photos. If the digital camera device 50 is turned on when the digital camera device 50 is in review mode, the digital camera device 50 typically displays the "youngest" (i.e., the most-recently captured) image. So, by having the alert image by the first image, the user would see the alert image when he turns on the digital camera device 50. As a variation of this, if the user turns on the digital camera device 50 when it is in capture mode but later selects review mode, the alert image would be shown to the user at that time. The alert image would also be viewable to the user when he reviews photos in an "album" mode where multiple photos are shown at once in a thumbnail fashion.

If the alert image is to be displayed as the first image, the controller 110 can find the most recent directory and then name the alert image as the most recent image, as it is the most-recent image that will be displayed first by the digital camera device 50. For example, many digital camera devices use the Design Rule for Camera File System (DCF), which specifies an alphanumeric naming convention for directories and images, where directories are LLLLLDDD and images are LLLLDDDD (L=letter, D=digit). When a new directory or image is created, it is given a number that is one higher than the last directory or image created (e.g., DIRX__001, DIRX__002, DIRX__003, IMG__0200, IMG__0201 etc.). So, if the storage device 100 stores DIRX__001 and DIRX__001, and DIRX__002 contains IMG__0201, IMG__0202, and IMG__0203, the controller 110 can update the FAT table 144 to indicate that the alert image is IMG__0204 in DIRX__002. Of course, this is just one example, and other techniques can be used to position an alert image as the "youngest" photo in the "youngest" folder, depending on the file system that is used.

Returning to the flow chart of FIG. 3, after the controller 110 stores the new alert image, it can delete any prior alert images (act 230). Rather than actually deleting the image file, the controller 110 can simply update the FAT table 144 to remove the reference to the old image (e.g., in the above example, remove the Image4 entry in the FAT table 144).

The above acts were taken if the storage device 100 determined that an alert condition occurred. If an alert condition did not occurred, the storage device 100 can determine whether the user cancelled the alert mode (act 240). Since, in this embodiment, it is the storage device 100—and not the digital camera device 50—that is providing the alert functionality, the digital camera device 50 likely does not even know that the storage device 100 is providing this service. As such, the digital camera device 50 would not provide an explicit input mechanism to allow the user to cancel the alert mode or to provide other input or settings selection (e.g., selection of the type of alert image, when and how often alerts appear, etc.). To accommodate for this situation, various mechanisms can be used to communicate user intention to the storage device's controller 110. For example, the user can provide input to the storage device's controller 110 by shooting one or more totally black images (e.g., by blocking the camera's iris with the user's hands or other object). In this example, the controller 110 can be configured to sum the values of pixels of an image taken by a user, and if that sum is consistent with a totally black image, the controller 110 can interpret that image as a signal from the user. As another example, the controller 110 can be sensitive to different on/off power patterns. For example, if the user turns the digital camera device on, then off, then on again without shooting any image within a short period of time, the controller 110 can interpret this as a signal from the user. As yet another example, the storage device 100 can display a question image giving the user the option of deleting it or leaving it and turning off the digital camera device 50. The controller 110 can be configured to know if the question image was deleted or left, and when power comes back, the controller 110 can act accordingly (and delete the question image because it is no longer needed). The user may also be able to provide input by removing the storage device 100 and putting it into another host device (e.g., a PC, via a reader), where the user can use an application on that other host device to input settings.

If the user canceled the alert mode, the alert mechanism process ends (act 245). Otherwise, the controller 110 floats the alert image as the youngest (e.g., by changing the file properties, such as path, date, and name) (act 250), if it is desired to have the alert image be the first image displayed by the digital camera device 50. This process is similar to the one discussed above in conjunction with act 220, in which the FAT table 144 was updated. Basically, if there was a prior alert image (e.g., 80% full), and the user continues to take images (but the next threshold, if there is one, has not been reached yet), the alert image is still valid but would no longer be the first image to be displayed by the digital camera device 50 (because the FAT table 144 would no longer point to it as the first image). Act 250 can be used to "float" the alert image to be top of the list again, if this is desired. (As discussed in the other branch of the flow chart, if a new alert image was stored, the previous alert image can be deleted. This is another way in which the alert message can be considered to be floated.)

In acts 220, 230, and 250, operations were taken to update the FAT table 144 to store the alert image in the memory 120 so that the alert image is displayed by the digital camera device 50 when the digital camera device 50 displays images stored in the memory 120 (e.g., as the first image). While this update can occur at any suitable time, there is a risk that this update will be overwritten by the digital camera device 50, if the digital camera device 50 caches a copy of the FAT table (and also the directory tables) somewhere in the digital camera device 50 (e.g., in its RAM 165). In this situation, the digital camera device 50 will make changes to the FAT and directory tables on the cached version in the digital camera device 50 and will later overwrite the FAT table 144 stored in the storage device's memory 120 with a copy of the cached version. This means that any updates the storage device's controller 110 makes to the FAT table 144 stored in the storage device's memory 120 can be overwritten when the digital camera device 50 clears its cache.

To address this situation, the controller 110 can update the FAT table 144 only when it knows that the digital camera device's cache is empty. (Until that time, the controller 110 can create and update a copy of the FAT table (a "shadow copy") somewhere on the storage device 100, leaving the real FAT table in place. At the appropriate time, the controller 110 can replace the real FAT table with the shadow copy.) The digital camera device's cache should be empty when the digital camera device 50 powers up, so that it a good time for the controller 110 to update the FAT table 144 (until then the controller 110 can store a proposed version of the FAT table somewhere else in the storage device 100). However, detecting power up of the storage device 100 may not indicate that the digital camera device 50 is also powering up because the digital camera device 50 may not have been shut down when the storage device 100 was (e.g., when the digital camera device 50 shuts down the storage device 100 to conserve power). Accordingly, in this embodiment, the controller 110 determines if the digital camera device 50 is going through a boot-up/power-up operation (act 260). If it is, the controller 110 knows that the digital camera device's cache is likely empty and that it is safe to update the FAT table 144 (act 270). Otherwise, the alert process ends without the FAT table 144 being updated (act 280). (If the storage device 100 just assumes that changes to the FAT table 144 will not be overwritten, act 270 is not needed, as acts 220, 230 and 250 are performed to the actual FAT table 144. However, when accommodating for the caching issue, acts 220, 230 and 250 would be performed on the shadow copy of the FAT table instead of the actual FAT table 144.)

The controller 110 can detect that the digital camera device 50 is going through a boot-up/power-up operation in any suitable manner (e.g., by checking the master partition sector, the root directory sector, the first FAT table sector, or a combination thereof). For example, during boot-up, the digital camera device 50 accesses the boot data 142 stored in the storage device's memory 120. So, if the controller 110 detects that the boot data 142 is being read, it can assume that the digital camera device's cache is empty and that it is safe to update the FAT table 144.

After seeing the alert image, the user can delete the alert image as he could any other photo on his storage device. After this deletion, the alert image can re-appear if the alert image is once again due, or the controller 110 can be configured to interpret the deletion of the image as a signal that the user does not want to see this alert image for the same alert condition. Also, if the user deleted some images so the amount of memory used is under the threshold, the controller 110 can delete the alert image automatically.

It should be noted that, because the alert image is just like any other image on the storage device 100, the behavior of the storage device 100 when inserted in the digital camera device 50 will be the same as its behavior when inserted in any other host device such as a personal computer (PC) (via a reader), meaning that the alert image will be created and displayed there too.

There are many advantages associated with these embodiments. As discussed above, some digital camera devices provide information to a user concerning the available capacity of a storage device to store digital images. However, if the user is not paying close attention to this display of information or if the user can only see the information by manually navigating to a menu, the user may not be aware that storage device is nearing capacity until he attempts to take a digital image and receives a "Memory Full" message. This can be frustrating to a user, especially if the user was attempting to capture a special, one-in-a-lifetime moment. With these embodiments, the user is provided with a pro-active, positive alert that catches the user's attention when the storage device 100 approaches its full capacity.

There are many alternatives that can be used with these embodiments. For example, as mentioned above, the acts of the embodiment shown in FIG. 2 occur when the storage device 100 is powered up, and the alert image is the first image shown to the user when he selects the review mode. However, since these acts occur at power-up, if the user takes additional photos during a session (i.e., a continuous period of time when the digital camera device 50 is on and takes photos) and then enters the review mode, the first image that the user will see will be the most-recently taken photo of that session—not the alert image. The alert image would still be in the camera roll, but the user would see the alert image only when he browses back to review the images until he reaches beyond the photos taken during the current session. Accordingly, in an alternate embodiment, instead of or in addition to checking for the alert condition upon power-up of the storage device 100, the controller 110 can check for the alert condition at one or more times during a session (e.g., after a certain amount of time has elapsed, after every image capture, after X image captures, etc.) (assuming caching is not a problem). This way, an alert image may be "fresher" than in the embodiment where the alert condition is only checked at power-up. However, depending on the threshold level, more frequent checks may be deemed unnecessary (e.g., if it is unlikely that the user will consume all the available memory in one session).

As another alternative, as mentioned above, an alert image can convey other information in addition to or instead of one or more "memory almost full" alerts (e.g., 80%, 90%, 95%). In this way, any type of specified alert condition can trigger the appropriate alert image. For example, if the user takes shaky pictures (e.g., as determined by the storage device's controller 110), the controller 110 can insert an alert image suggesting that the user use a tripod. As another example, if the alerting condition is images that are too dark, the alert image can suggest that the user use a flash. The controller 110 can also be sensitive to alert conditions of the storage device 100 itself, such as the wear of the memory 120. Of course, these are just examples, and other alert conditions and alert images can be used.

In another alternate embodiment, the storage device 100 determines whether or not to use the alert image functionality based on the identification of the digital camera device 50, as some digital camera devices 50 may not support the display of images taking with certain variations of the JPEG standard (although using the generic JPEG format can provide compatibility with many current digital camera devices). The storage device 100 can contain a list of supported or unsupported digital camera devices and can compare the digital camera device's ID with this list to determine whether the functionality should be enabled. This alternative may be particularly desired if the storage device 100 is transported from one digital camera device to another while being used. The storage device 100 can determine the identification of the digital camera device by parsing EXIF data, by scanning for ASCII strings in images stored by the digital camera device, or by examining metadata. This check can be performed after the first image is stored on the storage device 100 after being powered up.

Another alternate embodiment relates to the use of a bookmark image instead of or in addition to an alert image. A bookmark image is an image that is displayed by the digital camera device 50 when the digital camera device 50 displays images stored in the memory 120 of the storage device and is stored between images stored during different sessions (i.e., a continuous period of time when the digital camera device 50 is on and takes photos). Like the alert image, the bookmark image can take any suitable form, and, in one embodiment, the bookmark image is also the alert image. For example, the bookmark image can be different colors depending on the remaining capacity of the storage device 100 (e.g., green, yellow and red).

Figure 4:
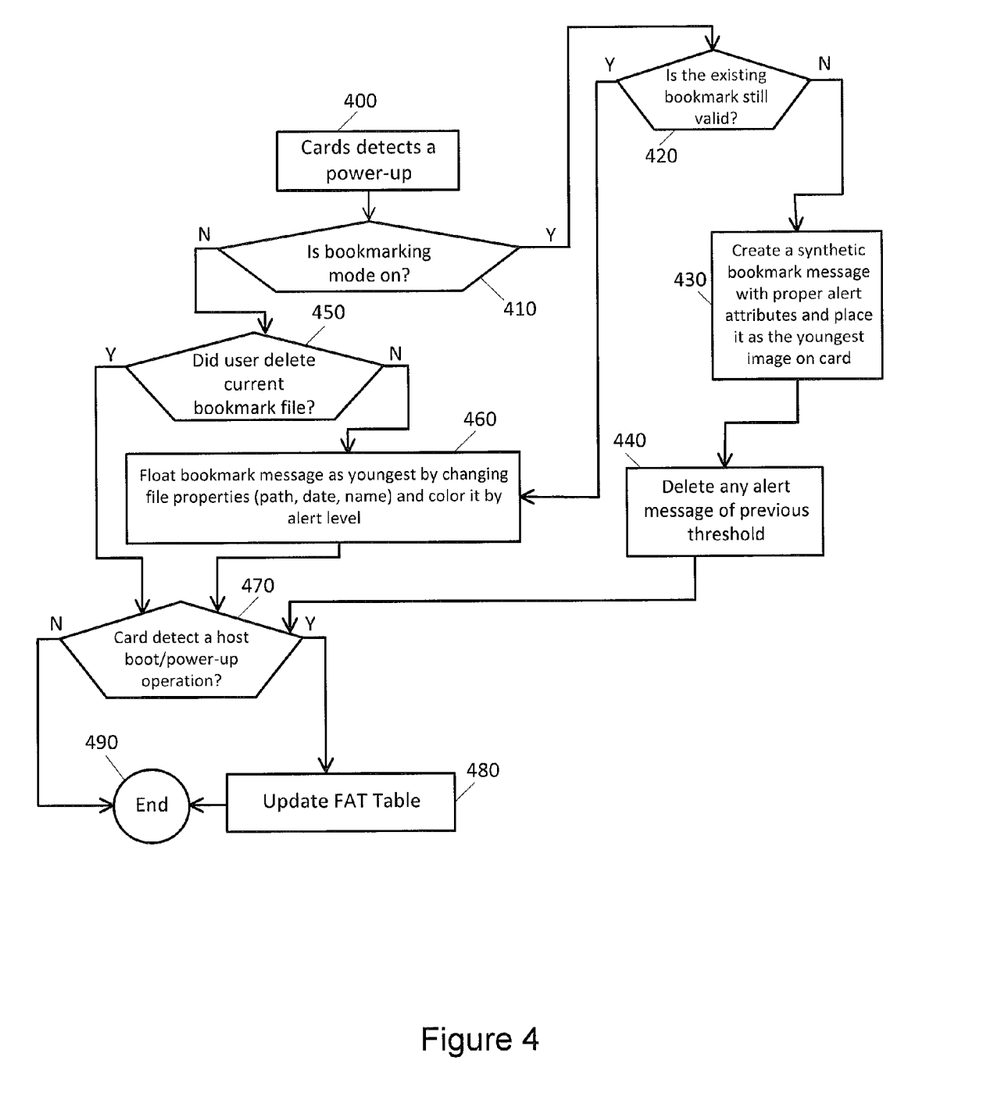
FIG. 4 is a flow chart of a method of an embodiment for displaying a bookmark image.

FIG. 4 is a flow chart illustrating one possible implementation of this embodiment. In this embodiment, the acts in this method occur when the storage device 100 is powered up (act 400). The controller 100 first detects whether the bookmarking mode is on (act 410). (The user can turn this mode on/off using the input mechanisms described above, for example.) If the bookmarking mode is on, the controller 110 creates a "synthetic" bookmark message with the proper alert attributes and places it as the "youngest" image in the storage device (act 430). This "youngest" image separates the "old" photos that were taken in previous sessions from the new photos to be taken in the current session. As such, this bookmark image indicates to the browsing user that he has reached "the bottom" of the current session. Next, the controller 110 can delete an alert message of a previous threshold (however, in some situations, the user may wish to keep the prior bookmarks) (act 440). If the bookmarking mode is not on, the controller 110 determines whether or not the user deleted the current bookmark file (act 450). If he didn't, the bookmark image is floated as the youngest (act 460). Finally, the storage device 100 detects whether or not the digital camera device 50 is booting/powering-up (to make sure the digital camera device's cache is empty, as discussed above) (act 470). If boot/power-up is detected, the FAT table 144 is updated (act 480). If not, the process ends (act 490).

Figure 5:
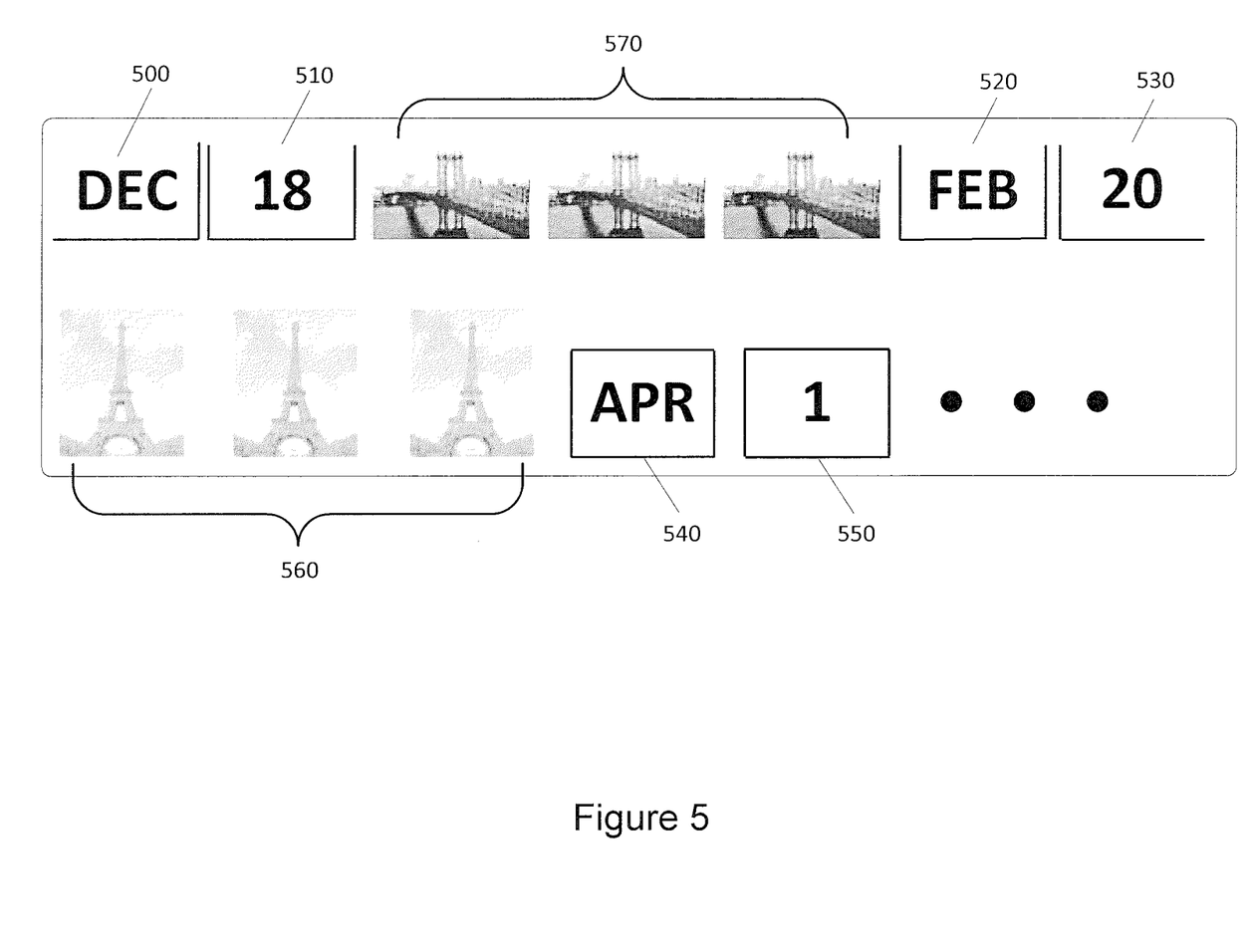
FIG. 5 is an example of a bookmark image of an embodiment.

As mentioned above, a bookmark image can be placed each time a session starts. As an alternative to this, a bookmark image can be placed each time there is a new image of a different date. This embodiment is illustrated in FIG. 5. As shown in FIG. 5, there are a plurality of bookmark images 500, 510, 520, 530, 540, 550. Here, the bookmark images are created each time new pictures are taken on a different date. For example, the bookmark images "FEB" and "20" are placed between images 570, 560 taken on December 18$^{th}$ and April 1$^{st}$. In this embodiment, it may be preferred to keep old bookmark images instead of floating them. It may also be preferred that each saved bookmark image show the date of the bookmark (as shown in FIG. 5). However, if it is difficult for the storage device 100 to generate an image with arbitrary text, a date bookmark can be a sequence of two, three, or more pre-stored images (e.g., day, month, year), as illustrated in FIG. 5.

In yet another alternate embodiment, the digital camera device 50 (instead of the storage device 100) can perform some or all of the alert and/or bookmark image functionality discussed above. For example, the digital camera device 50 can parse the FAT table 144 to determine the available capacity of the memory 120 (or detect any other the alert condition) and/or can update the FAT table 144 to store an alert image, or the storage device 100 can detect whether the alert condition has occurred, while the digital camera device 50 stores the alert image, or vice versa. In yet another embodiment, the camera can provide the alert via a mechanism other than an alert image (e.g., a sound and/or flashing icon display on its display device 175).

CONCLUSION

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage device comprising: an interface through which the storage device can connect to and communicate with a digital camera device; a memory; and a controller in communication with the interface and the memory, wherein the controller is configured to: determine if an alert condition has occurred; and if the alert condition has occurred, display an alert image on a display device of the digital camera device when the digital camera device displays images stored in the memory, wherein the alert image is displayed in the same manner as other images stored in the memory.

2. The storage device of claim 1, wherein the alert condition occurs when an available capacity of the memory crosses a threshold limit.

3. The storage device of claim 1, wherein the alert image is a first image that is displayed by the digital camera device when the digital camera device displays images stored in the memory.

4. The storage device of claim 1, wherein the storage device stores a file allocation table that references images stored in the memory, and wherein the controller is further configured to:
add a reference to the alert image to a copy of the file allocation table stored in the storage device; and
replace the file allocation table with the copy of the file allocation table after detecting power up of the digital camera device.

5. The storage device of claim 1, wherein the memory comprises a hidden area and a user area, and wherein the alert image is stored in the hidden area and copied to the user area after the alert condition has occurred.

6. The storage device of claim 1, wherein the controller is further configured to determine which of a plurality of alert conditions has occurred and to select one of a plurality of alert images based on which of the plurality of alert conditions has occurred.

7. The storage device of claim 1, wherein the controller is further configured to display store a bookmark image between images.

8. The storage device of claim 7, wherein the alert image is also the bookmark image.

9. The storage device of claim 1, wherein the controller is further configured to determine an identification of the digital camera device and, based on that identification, determine whether or not to display the alert image.

10. A digital camera device comprising: an interface through which the digital camera device can connect to and communicate with a storage device having a memory; a display device; and a controller in communication with the interface and the display device, wherein the controller is configured to: determine if an alert condition has occurred; and if the alert condition has occurred, display the alert image on the display device when the digital camera device displays images stored in the memory of the storage device, wherein the alert image is displayed in the same manner as other images stored in the memory.

11. The digital camera device of claim 10, wherein the alert condition occurs when an available capacity of the memory of the storage device crosses a threshold limit.

12. The digital camera device of claim 10, wherein the alert image is a first image that is displayed by the display device when displaying images stored in the memory of the storage device.

13. The digital camera device of claim 10, wherein the storage device stores a file allocation table that references images stored in the memory, and wherein the controller is further configured to add a reference to the alert image to the file allocation table.

14. The digital camera device of claim 10, wherein the memory of the storage device comprises a hidden area and a user area, and wherein the alert image is stored in the hidden area and copied to the user area after the alert condition has occurred.

15. The digital camera device of claim 10, wherein the controller is further configured to determine which of a plurality of alert conditions has occurred and to select one of a plurality of alert images based on which of the plurality of alert conditions has occurred.

16. The digital camera device of claim 10, wherein the controller is further configured to display a bookmark image between images.

17. The digital camera device of claim 16, wherein the alert image is also the bookmark image.

18. A method for displaying an alert image, the method comprising: determining if an alert condition has occurred; and if the alert condition has occurred, displaying an alert image on a display device of a digital camera device when the digital camera device displays images stored in a memory of a storage device, wherein the alert image is displayed in the same manner as other images stored in the memory.

19. The method of claim 18, wherein the method is performed by the storage device.

20. The method of claim 18, wherein the method is performed by the digital camera device.

21. The method of claim 18, wherein the alert condition occurs when an available capacity of the memory crosses a threshold limit.

22. The method of claim 18, wherein the alert image is a first image that is displayed by the digital camera device when the digital camera device displays images stored in the memory.

23. The method of claim 18, wherein the storage device stores a file allocation table that references images stored in the memory, and wherein the method further comprises:
adding a reference to the alert image to a copy of the file allocation table stored in the storage device; and
replacing the file allocation table with the copy of the file allocation table after detecting power up of the digital camera device.

24. The method of claim 18, wherein the memory comprises a hidden area and a user area, and wherein the alert image is stored in the hidden area and copied to the user area after the alert condition has occurred.

25. The method of claim 18 further comprising determining which of a plurality of alert conditions has occurred and selecting one of a plurality of alert images based on which of the plurality of alert conditions has occurred.

26. The method of claim 18 further comprising displaying a bookmark image between images.

27. The method of claim 26, wherein the alert image is also the bookmark image.

28. The method of claim 18 further comprising determining an identification of the digital camera device and, based on that identification, determining whether or not to display the alert image.

* * * * *

UNITED STATES PATENT AND TRADEMARK OFFICE
CERTIFICATE OF CORRECTION

PATENT NO. : 8,964,092 B2
APPLICATION NO. : 13/767568
DATED : February 24, 2015
INVENTOR(S) : Rahav Yairi et al.

It is certified that error appears in the above-identified patent and that said Letters Patent is hereby corrected as shown below:

In the Claims

In column 11, claim 7, line 41, after "configured to display" delete "store".

Signed and Sealed this
Eighth Day of September, 2015

Michelle K. Lee
*Director of the United States Patent and Trademark Office*